US011109011B2

(12) United States Patent
Horvitz et al.

(10) Patent No.: US 11,109,011 B2
(45) Date of Patent: *Aug. 31, 2021

(54) VIRTUAL REALITY WITH INTERACTIVE STREAMING VIDEO AND LIKELIHOOD-BASED FOVEATION

(71) Applicant: Microsoft Technology Licensing, LLC, Redmond, WA (US)

(72) Inventors: Eric Horvitz, Kirkland, WA (US); Eduardo Cuervo, Bellevue, WA (US); David Chu, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/731,693

(22) Filed: Dec. 31, 2019

(65) Prior Publication Data
US 2020/0169716 A1 May 28, 2020

Related U.S. Application Data

(63) Continuation of application No. 15/622,836, filed on Jun. 14, 2017, now Pat. No. 10,560,680.
(Continued)

(51) Int. Cl.
*H04N 13/00* (2018.01)
*H04N 13/139* (2018.01)
(Continued)

(52) U.S. Cl.
CPC ......... *H04N 13/139* (2018.05); *H04N 13/106* (2018.05); *H04N 13/117* (2018.05);
(Continued)

(58) Field of Classification Search
CPC .. H04N 13/106; H04N 13/117; H04N 13/139; H04N 13/161; H04N 13/194;
(Continued)

(56) References Cited

U.S. PATENT DOCUMENTS 8,553,769 B2 * 10/2013 He .................. H04N 19/33
375/240.12
9,641,644 B2 * 5/2017 Levanon ............ H04L 65/602
(Continued)

*Primary Examiner* — Thai Q Tran
*Assistant Examiner* — Stephen R Smith

(57) ABSTRACT

A server may be configured to receive first pose data from a virtual reality device, generate second pose data, including a pose prediction, based at least on the first pose data, render a map representation based at least on the pose prediction, determine regions of the map representation based on a likelihood of view of each of the regions, perform foveation in each of the regions and generate an encoded frame based on the regions and a network parameter, and send the encoded frame and second pose data to the device. The encoding may associate each of the regions with a quality level and base the foveation on each region's associated quality level. The foveation may use different quantization parameters for each of the regions and/or use rendering foveation for each of regions. Network conditions such as latency, bandwidth, and/or jitter may be considered for bit allocation in the foveation.

20 Claims, 9 Drawing Sheets

Related U.S. Application Data

(60) Provisional application No. 62/451,688, filed on Jan. 28, 2017.

(51) Int. Cl.
| | | |
|---|---|---|
| *H04N 21/2343* | (2011.01) | |
| *H04N 21/24* | (2011.01) | |
| *H04N 21/81* | (2011.01) | |
| *H04N 21/4402* | (2011.01) | |
| *H04N 13/117* | (2018.01) | |
| *H04N 13/161* | (2018.01) | |
| *H04N 13/194* | (2018.01) | |
| *H04N 13/344* | (2018.01) | |
| *H04N 13/383* | (2018.01) | |
| *H04N 13/106* | (2018.01) | |

(52) U.S. Cl.
CPC ......... *H04N 13/161* (2018.05); *H04N 13/194* (2018.05); *H04N 13/344* (2018.05); *H04N 13/383* (2018.05); *H04N 21/234345* (2013.01); *H04N 21/234363* (2013.01); *H04N 21/2402* (2013.01); *H04N 21/440245* (2013.01); *H04N 21/816* (2013.01)

(58) Field of Classification Search
CPC ............... H04N 13/344; H04N 13/383; H04N 21/234345; H04N 21/234363; H04N 21/2402; H04N 21/440245; H04N 21/816

USPC .......... 386/200; 348/36, 39, 43, 53; 709/219
See application file for complete search history.

(56) References Cited

U.S. PATENT DOCUMENTS

| | | | |
|---|---|---|---|
| 9,892,546 B2* | 2/2018 | Jenkins | G06T 19/003 |
| 10,650,590 B1* | 5/2020 | Topiwala | G06F 3/011 |
| 2005/0259881 A1* | 11/2005 | Goss | G06T 9/001 |
| | | | 382/243 |
| 2016/0163205 A1* | 6/2016 | Jenkins | G06T 17/05 |
| | | | 701/3 |
| 2016/0328884 A1* | 11/2016 | Schowengerdt | G02B 27/017 |
| 2017/0236252 A1* | 8/2017 | Nguyen | G06T 15/00 |
| | | | 345/419 |
| 2017/0287446 A1* | 10/2017 | Young | G06F 3/013 |
| 2017/0295353 A1* | 10/2017 | Hwang | H04N 13/144 |
| 2018/0053284 A1* | 2/2018 | Rodriguez | G06T 3/0093 |
| 2018/0077210 A1* | 3/2018 | Hannuksela | H04N 21/47217 |
| 2018/0089903 A1* | 3/2018 | Pang | H04N 5/2226 |
| 2018/0115743 A1* | 4/2018 | McLoughlin | H04N 7/04 |
| 2018/0137602 A1* | 5/2018 | Spitzer | G06T 3/4007 |
| 2018/0167613 A1* | 6/2018 | Hannuksela | H04N 19/115 |
| 2018/0176535 A1* | 6/2018 | Ninan | G06F 3/013 |

* cited by examiner

VIRTUAL REALITY WITH INTERACTIVE STREAMING VIDEO AND LIKELIHOOD-BASED FOVEATION

CROSS REFERENCES TO RELATED APPLICATIONS

This application is a continuation application and, pursuant to 35 U.S.C. § 120, is entitled to and claims the benefit of earlier filed application U.S. application Ser. No. 15/622,836 filed Jun. 14, 2017, which in turn claims priority to and the benefit of U.S. Provisional Patent Application No. 62/451,688 filed Jan. 28, 2017, the entire contents of both of which are hereby incorporated by reference.

BACKGROUND

Recent advances in wearable high resolution head-mounted displays (HMDs) have made it possible to implement immersive virtual reality systems on a range of consumer systems. In addition to HMDs, direct support for VR videos has also recently been launched by certain news feeds and video sites.

For a truly immersive VR experience, the three properties of quality, responsiveness and mobility are important. By quality, it is meant that images should be realistic and life-like enough to provide visual portrayals in a virtual environment that heighten a user's sense of immersion. By responsiveness, it is meant that any user motion, especially of the user's head, should be reflected in visual feedback as quickly as possible to account for the user's ocular proprioception sensitivity. By mobility, it is meant that the system allows the user to move untethered in physical space, free to explore the virtual world.

SUMMARY

This summary is provided to introduce a selection of concepts in a simplified form that are further described below in the Detailed Description. This summary is not intended to exclusively or exhaustively identify key features or essential features of the claimed subject matter. Nor is it intended as an aid in determining the scope of the claimed subject matter.

In one example implementation, a network includes a server that is configured to communicate with, and process data for, a device providing an immersive virtual reality experience to a user. For example, the device may be a head mounted display that is configured to determine and send first pose data to the server through a wireless interface, receive encoded frames from the server, and display the frames to a user.

The server may be configured to receive first pose data from the device, generate second pose data, including a pose prediction, based at least on the first pose data, render a map representation based at least on the pose prediction, determine a plurality of regions of the map representation based on a likelihood of view of each of the plurality of regions, perform foveation in each of the plurality of regions of the map representation and generate an encoded frame based on each of the plurality of regions and at least one network parameter, and send the encoded frame and second pose data to the device. The server may determine the regions based on a determination of a likelihood of view of each region by the user of the device. The server may provide a virtual reality experience that is optimized by associating each of the regions of the map representation with a quality level where the foveation performed for each of the plurality of regions may be based on each region's associated quality level. The foveation may include performing encoding foveation using a different quantization parameter for each of the plurality of regions of the map representation and/or performing rendering foveation for each of the plurality of regions of the map representation. The immersive virtual reality experience of a user may be enhanced by taking network conditions such as latency, bandwidth, and/or jitter into account for bit allocation when the foveation is performed in the various regions of the map representation.

During operation, the server may determine that one or more of the network conditions has changed. For example, latency, bandwidth, and/or jitter may change due to a changing network environment. The server may then modify an allocation of bits between at least two of the regions of the map representation based on the change in the one or more network parameters to optimize a device user's virtual reality experience when network conditions either degrade or improve.

In the example implementation, the device may be configured to receive the encoded frame and second pose data from the server, determine third pose data including a current pose of the user/device, decode the encoded frame, mesh warp the decoded frame using the second and third pose data to generate a first mesh warped frame and display the first mesh warped frame. The device may then determine if a second encoded frame has been received from the server. If the device determines that a second frame has not been received from the server, the device may determine fourth pose data including a current pose of the user/device, mesh warp the last decoded frame using the second and fourth pose data to generate a second mesh warped frame, and display the second mesh warped frame. If, however, the device determines that a second encoded frame has been received from the server, the device may determine fourth pose data including a current pose of the user/device, decode the second encoded frame, mesh warp the second decoded frame using the fourth pose data and fifth pose data received from the server along with the second encoded frame to generate a second mesh warped frame, and display the second mesh warped frame.

DETAILED DESCRIPTION

Figure 1:
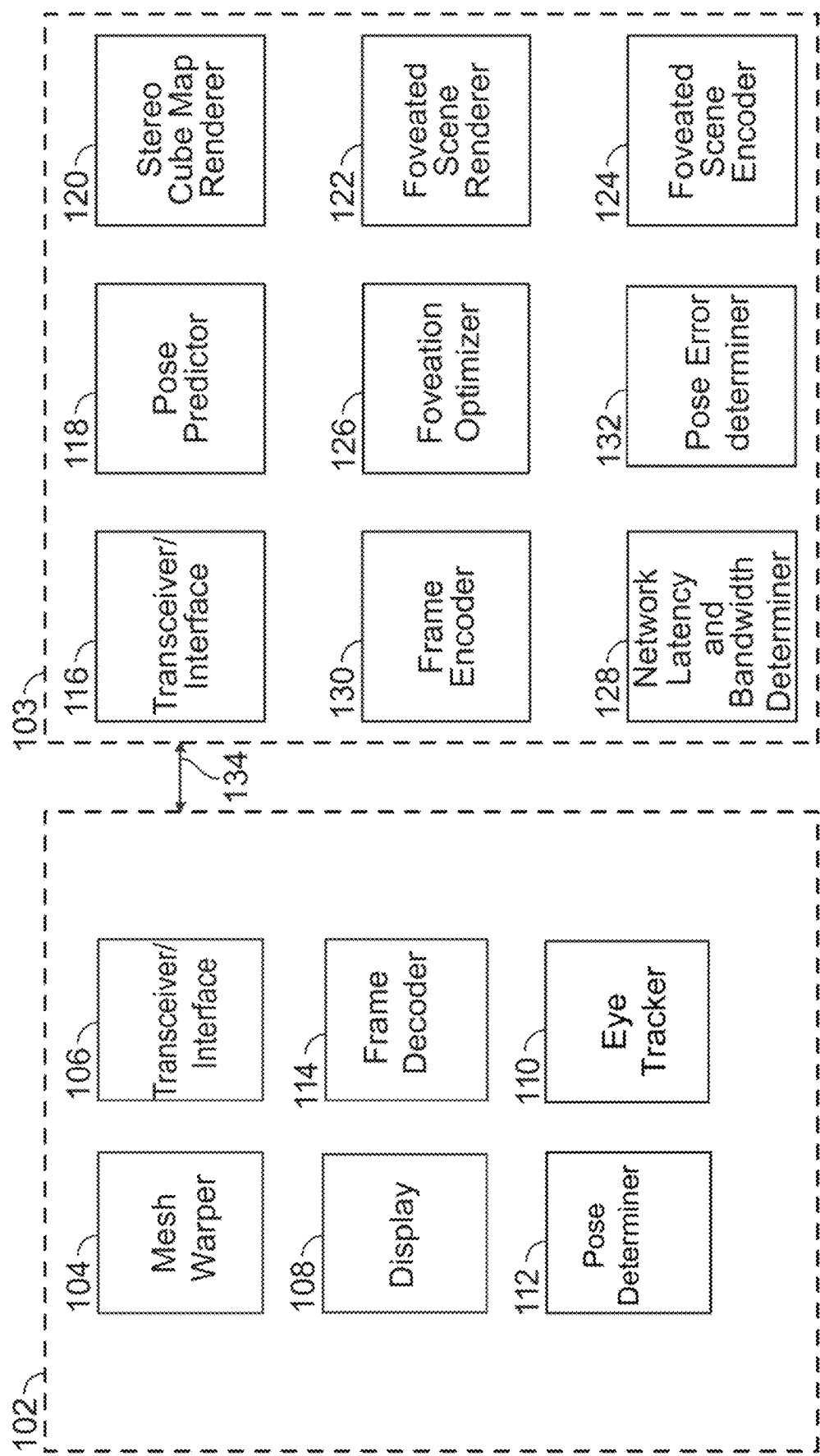
FIG. 1 is a simplified block diagram illustrating functions of an example virtual reality system comprising a head mounted display and a server according to an implementation.

The system, method and apparatus will now be described by use of example embodiments. The example embodiments are presented in this disclosure for illustrative purposes, and not intended to be restrictive or limiting on the scope of the disclosure or the claims presented herein.

The technologies and techniques that are disclosed herein describe systems, methods and apparatus for virtual reality that provide simultaneous and balanced attainment of quality, responsiveness and mobility. Implementations of the disclosed embodiments achieve this by loading rendering work from a head mounted display (HMD), that is mobile and only requires a low-end GPU, to a high-end graphics processing unit (GPU) across a wireless access network (WAN) client. Because of the off-loading, the HMD is able to receive and display high quality imagery. To overcome WAN latencies, the implementations utilize speculative execution techniques based on those used for traditional mobile devices such as phones, tablets and laptops, but where the speculative execution techniques are modified for the particular needs of HMDs.

Because HMD virtual reality display quality requirements are more sensitive than the speculative execution requirements of traditional mobile devices, speculative execution alone is insufficient to provide the best quality and responsiveness for HMDs. For example, HMD requirements are substantially more stringent along several key dimensions. HMDs require faster responsiveness. HMDs must be responsive within 16 ms instead of the 60 ms accorded to traditional displays. For example, the negative effects of simulator sickness (e.g., nausea and eye fatigue) are much more severe than the annoyance of sluggishness displays. HMDs also require higher image resolution and quality. The near-eye displays of HMDs exacerbate poor display resolutions because each pixel is much closer to the eye and is greatly magnified on the user's retina. As a result, lower resolutions are much more noticeable. HMDs also require eye-independence. In most implementations, HMDs are stereo. The stereo rendering requires pushing twice as many pixels to the display as required for traditional displays. These three factors suggest that performance of an HMD ought to greatly benefit from maximally utilizing all available bandwidth between the HMD client and server to deliver the highest resolution imagery possible. At the same time, any latency or bandwidth changes must be handled responsively, so the user experience does not deteriorate and induce simulator sickness.

The disclosed implementations utilize panoramic stereo video and likelihood-based foveation in order to achieve the highest possible resolution while remaining responsive to network changes. The implementations render a wide field-of-view (FOV) panoramic stereo video in which any possible stereo view (e.g., due to unexpected head movement or network fluctuations) may be generated and displayed to a user. The panoramic stereo view is then foveated by reallocating pixels to foveation regions of areas where the user is most likely to look. An optimizer is utilized to constantly adapt to real-time data analysis of the user's head movement and network conditions to figure out the most useful foveation configuration, based on expectation/prediction. A system according to the implementations offers several important properties. The user will experience smooth video with a minimum amount of video stalls and black screens despite possible transient network disruptions. This is in spite of the fact that interactive video, unlike pre-recorded video, is not amenable to buffering. Also, the user's head and neck movements are reflected in the HMD's visual output in under 16 ms regardless of latency, and the resolution of the most likely view is always delivered at a desired target resolution. The resolution of less likely views degrades gracefully and the expected resolution is optimized with respect to observed user head movement and network conditions. Scene detail may be scaled up according to the power of a high-end desktop GPU, rather than an energy constrained GPU on the HMD. In an implementation, in order to provide an optimal user experience while preserving GPU resources in the server and to fully utilize the available bandwidth without exceeding it, the server may allocate varying degrees of bandwidth and GPU resources through pixel allocation to the foveation regions using the two complimentary techniques of foveated rendering and foveated encoding. The term foveation as used in this disclosure and claims means image processing techniques, such as foveated imaging, in which the resolution of an image varies across one or more foveation points. The foveation points may indicate the highest resolution areas of the image, corresponding to the eye's fovea, an area of densely packed cones that result in the highest visual acuity. Foveated rendering renders and shades fewer pixels in the lower quality areas that are less likely to be seen and more pixels in the areas more likely to be seen. In the same way, encoding foveation will use lower levels of quantization in the high quality areas, resulting in better looking visuals but higher bandwidth use, while using higher levels of quantization for the low quality regions. These techniques compliment well each other. For example, the entropy of a region with a lesser number of pixels is lower and the region compresses easier. Further increasing the quantization factor in these techniques makes the final size of the image even smaller. It is through this adaptive data driven decision making process that the embodiments make optimal use of the available resources presenting the best possible image to the user.

The disclosed implementations achieve high quality immersiveness in normal system conditions, yet still deliver gracefully degraded experiences in case of degradation of system conditions. The implementations of the embodiments provide optimized visual quality while maintaining responsiveness in the face of network fluctuations. The implementations also support scaling to high-end scene detail despite the fact that the HMD worn on the head may be power-constrained, untethered and mobile. The disclosed implementations greatly expand the scope of viable HMD content while requiring only modest fixed function computation on the HMD device. The embodiments may also be implemented in other types of systems to improve video quality in real-time free-viewpoint video, such as free-viewpoint Skype video.

The disclosed implementations provide advantages over conventional HMDs which are fundamentally challenged in seeking to simultaneously provide quality, responsiveness and mobility because choosing to optimize any two of quality, responsiveness and mobility rules out optimizing the third. For example, some conventional HMDs optimize quality and responsiveness but the user's headset is tethered to a high-end desktop GPU. This may cause cord entanglement that ranges from causing occasional annoyance to severe liability. In other conventional HMDs, mobility is optimized by configuring the HMD to include a mobile GPU for display image rendering work. However, even high-end mobile GPUs are two orders of magnitude less powerful than desktop GPUs (2 W vs. 200 W). This lower rendering capability is a significant limitation because either quality or responsiveness must be sacrificed, both of which compromise a user's sense of immersion. It is known that even minor motion-to-photon delay above 16 ms (60 Hz) impedes immersion and leads to motion sickness. Also, stereo rendering of two images, one per eye, is nominally twice as expensive as standard monocular rendering, further pushing down quality for fixed responsiveness.

The disclosed implementations also provide advantages over conventional methods used to address the shortcomings of using a mobile GPU in an HMD. One conventional method used is to offload rendering to an off-device high-end GPU. In this solution, a device client merely sends user inputs and receives back frame buffers. Such thin client interactive video streaming has been used for monovision rendering and falls into one of two categories. The first category of streaming used for thin client devices, local area network (LAN) streaming, assumes that a high-end GPU is on a nearby local device. For example, a gaming device normally can stream to a mobile device as long as it is in the same LAN. In this case, opportunistic local resource scavenging is a challenge because most devices which users carry, e.g., phones, tablets, non-gaming laptops, do not have sufficient real-time rendering performance for high quality stereo. Technology trends suggest that GPU battery drain will continue to limit rendering performance of local mobile devices. Therefore, local LAN streaming for conventional HMDs is likely only applicable in scoped situations where rendering machines such as gaming consoles and gaming PC rigs are available in close proximity to the HMD. The second category of streaming used for thin client devices, wide area network (WAN) streaming, streams to clients from high-end GPUs in data centers across a WAN. However, WAN streaming introduces latency beyond 16 ms, exceeding the tolerance of HMDs.

The disclosed implementations have applicability to any appropriate method and/or apparatus utilized for virtual reality applications. For example, the techniques of foveation disclosed herein may be used in virtual reality systems that render an image using post-render image warping operations that are informed by multiple different server-rendered views of a virtual scene. In these systems, gaps formed as a result of performing post-render image warping operations on a server-rendered view may be rendered using pixel information gleaned from different server-rendered views in which the gaps are visible. The different server-rendered views may have different perspectives of the virtual scene from which pixels corresponding to the gaps are visible. The different server-rendered views may include information about the gaps that are not included in the server-rendered view used as a reference for the post-render image warping operations. Use of the implementations may also be advantageous in these types of system. The applicability of the embodiments also extends to projective texturing systems in which the client renders a simplified version of the server's geometry and the 2D foveated images received from the server are warped and applied to the geometry in the client.

FIG. 1 is a simplified block diagram illustrating example functions of a virtual reality system comprising a head mounted display and a server according to an implementation. HMD 102 is shown as including the functional blocks of a transceiver/interface 106, a display 108, a mesh warper 104, a frame decoder 114, a pose determiner 112, and an eye tracker 110. Server 103 is shown as including the functional blocks of a transceiver/interface 116, a pose error determiner 132, a pose predictor 118, a stereo cube map renderer 120, a foveated scene renderer 122, a foveated scene encoder 124, a foveation optimizer 126, network latency and bandwidth determiner 128, a pose error determiner 132, and frame decoder 130. The functional blocks shown in FIG. 1 for HMD 102 and server 103 may be configured using any form or combination of hardware/circuitry, processors, and/or programs/code that implements the various functional blocks. The HMD 102 may be implemented as a low-power mobile device that can be worn comfortably by the user. Server 103 may be a computing device located in a cloud node having a powerful GPU.

Figure 2:
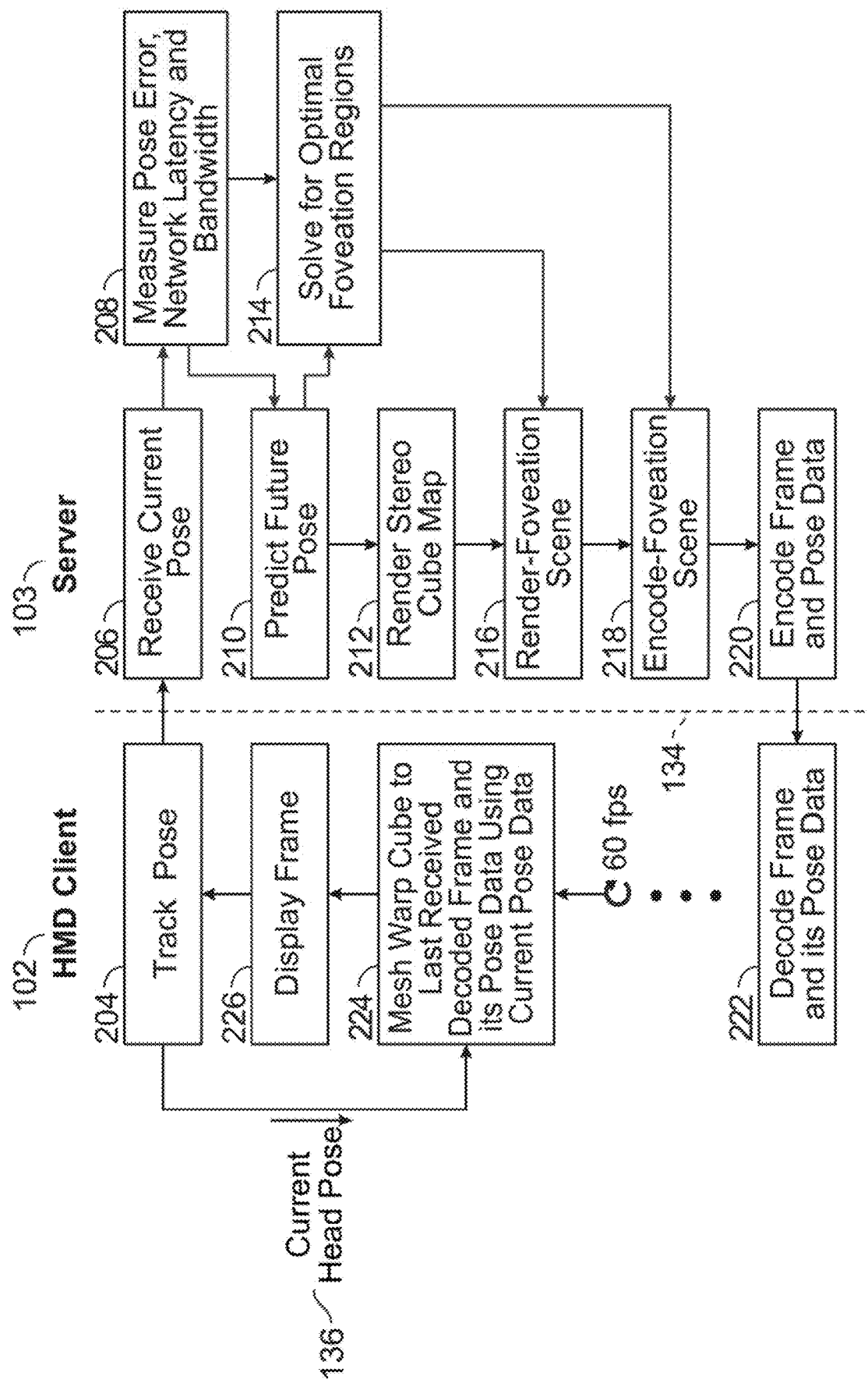
FIG. 2 is a simplified flow diagram of example operations that may be performed in the system of FIG. 1.

FIG. 2 is a simplified flow diagram of example operations that may be performed in the system of FIG. 1. FIG. 2 shows the high-level operation of an example implementation from the operations of sampling input through the operations of displaying output on HMD 102. Broken line 134 illustrates how the operations are divided between HMD 102 and server 103, with operations of HMD 102 on the left of broken line 134 and operations of server 103 on the right broken line 134.

An initialization process is first performed to setup HMD 102 and server 103 prior to the process of FIG. 2. For initialization, pose determiner 112 and/or eye tracker 110 of HMD 102 initiate tracking of the pose of the user of HMD 102. The current pose comprises pose data including a position of HMD 102 and a view orientation of a device user (wearer) generated by sensors configured in pose determiner 112 and/or in eye tracker 110 of HMD 102. The position is the location of the player in 3D world space and the view orientation is a rotation vector that represents where the player is looking. To initialize the system, HMD 102 sends the current pose to the server 103. The server 103 receives the current pose and then uses stereo cube map renderer 120 to generate a stereo cube map based on the current pose. Frame encoder 130 of server 103 then encodes this cube map and sends it back to HMD 102 along with its associated pose data through transceiver/interface 116. HMD 102 will then decode the cube map and obtain a new pose from pose determiner 112. Mesh warper 104 of HMD 102 can then be used to perform a computer graphics technique known as mesh warping to approximate a correct view matching its new pose, therefore hiding the user's perceived latency.

A mesh warp may be applied to the frame at a pose p in order to derive an appropriate view for a pose p'. Mesh warping is a type of Image-Based Rendering (IBR). Given an RGB cube map and matching depth cube map both at pose p (say, of the left eye), we can generate a novel view v' as if it had been taken from a new pose p'. Each pixel of the original view is mapped to a 3D position (since p and the depth map are known), and then the 3D position is re-projected to a pixel in the new view (since p' is known). The final view v' resolution may be proportional to the size of the frame. Assuming a typical mobile device (such as a HMD) field of view as 106° height, 94° width, a 4 k frame (3840→2160) generates 720 p final view frames (1280→720). In certain situations, if the translation is too great (i.e., the position of p and the position of p' are too far apart) then v' will suffer from visual artifacts such as disocclusions. For example, when posed looking at an open doorway and then stepping forward; from the original view, it is unclear what should appear in the disoccluded "holes" that are now visible. In this case, additional cube maps may be used to handle translations that are beyond a threshold, as is provided by the additional frames. Conversely, since the cube map covers a panoramic view, mesh warping is robust to arbitrary changes in rotation without introducing artifacts.

Once the initial mesh warped frame is displayed, the process starts as shown in the process of FIG. 2. From this point on, at 204, HMD 102 sends information/pose data to server 103 about the latest pose, which is also the latest pose used by mesh warper 104 in the last mesh warping. At 206, server 103 receives the latest pose. At 208, using the latest head pose information, pose error determiner 132 of server 103 may measure the network latency, bandwidth and the pose error induced by the latency, by the user's movements and the bandwidth. At 210, pose error determiner 132 provides these measurements to pose predictor 118 to predict a future pose by generating predictions for the user's pose in real time. At operation 212, stereo cube map renderer 120 uses the future pose prediction of Pose predictor 118 to render a cube map and provide the rendered cube map to foveated scene renderer 122.

Also, at operation 214, foveation optimizer 126 of server 103 uses the pose prediction from pose predictor 118 and network latency, bandwidth and/or jitter to adapt to changing conditions and solve for optimal foveation by ranking different concentric rectangular regions (foveation regions) of the stereoscopic cube map by the likelihood of being viewed by the user.

At 216, foveation scene renderer renders a foveation scene according to the ranking provided by foveation optimizer 126 and, at 218, foveation scene encoder encodes a foveation scene according to the rankings provided by foveation optimizer 126. Then, at 220, frame encoder 130 of server 103 encodes the scene in a frame and sends the encoded frame and its associated pose data (the pose used to generate the scene) to HMD 102.

At 222, decoder 112 of HMD 102 receives and decodes the encoded frame and the frame's associated pose data. Next at 224, frame decoder 114 provides the decoded frame to mesh warper 104 and mesh warper 104 performs mesh warping on the decoded frame. Mesh warper 104 uses the latest pose 136 from head pose tracker (operation 204) and the decoded frame's associated pose data that was received at 222 to perform the mesh warping. Next at 226, the mesh warped frame is displayed on the display 108 of HMD 102. Next, at 204, pose determiner 112 of HMD 102 sends the latest pose to server 103 and sever 103 repeats the process.

In the implementation of FIG. 2, use of asynchronous fast mesh warping allows HMD 102 to receive frames at a lower framerate (e.g. 60 fps) while displaying frames accurate to the user's position at a much higher framerate (e.g. 90 fps). Because mesh warping is significantly less resource demanding than rendering, and mesh warping speed is not dependent on scene complexity (mesh warping speed is only a fixed function of the screen resolution) mesh warping may run efficiently on mobile GPUs and HMD 102 is able to warp and decode frames in parallel. A scene can have arbitrarily complex visual details and effects, but warping speed may remain constant.

Because HMD 102 is able to decode and mesh warp frames in parallel, if frame decoder 114, which may be supplying decoded frames at 60 fps, does not have a decoded frame immediately ready for mesh warper 104, mesh warper 104 may reuse the last decoded frame received from frame decoder 114 and the last decoded frame's associated pose data to mesh warp and supply a frame to display 108 for display. For example, a decoded frame received at mesh warper 104 at time T1 may be mesh warped at time T1 using the decoded frames associated pose data received with that frame from server 103 and the latest pose information 136 for time T1. If a newly decoded frame has not been received at HMS 102 in a certain amount of time, mesh warper 104 may mesh warp that last received decoded frame using that frame's associated pose data received with that frame, but also using the latest pose information 136 for time T2 from pose determiner 112. In this manner, HMD 102 may display frames on display 108 at a faster rate than server 103 supplies frames.

Figure 3A:
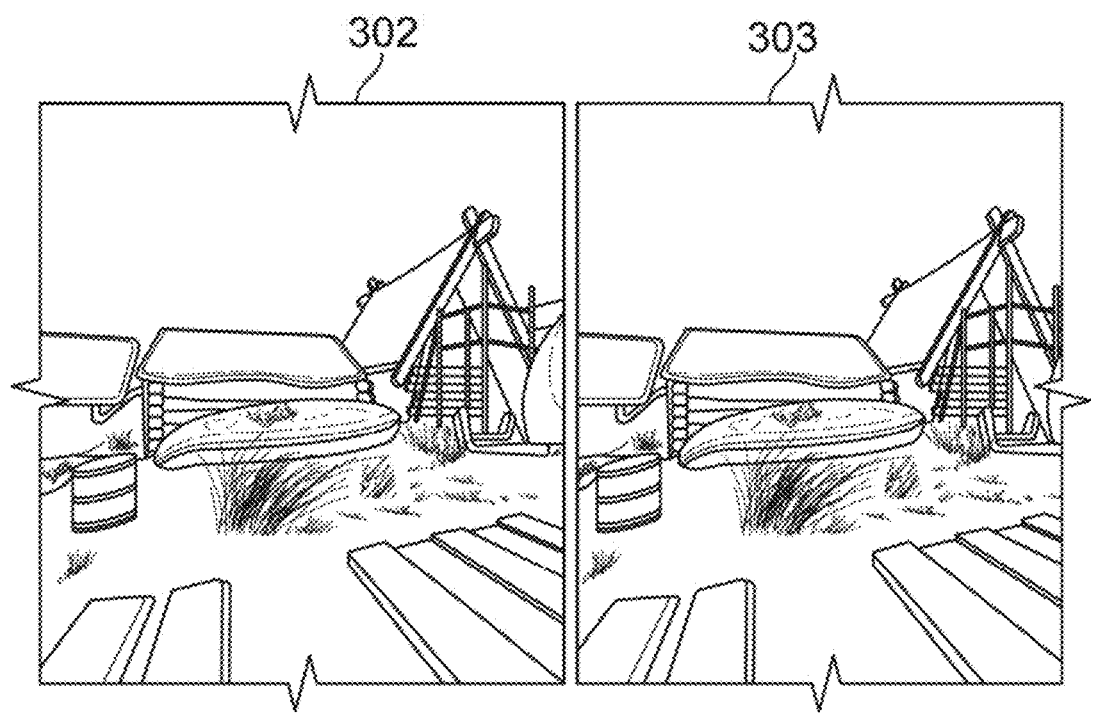
FIG. 3A is an example stereo view generated by an example head mounted display.

FIG. 3A is an example stereo view that may be generated by a head mounted display such as HMD 102 of FIGS. 1 and 2. FIG. 3 shows left eye view 301 and right eye view 303. FIG. 3 illustrates that the views may be slightly different.

Figure 3B:
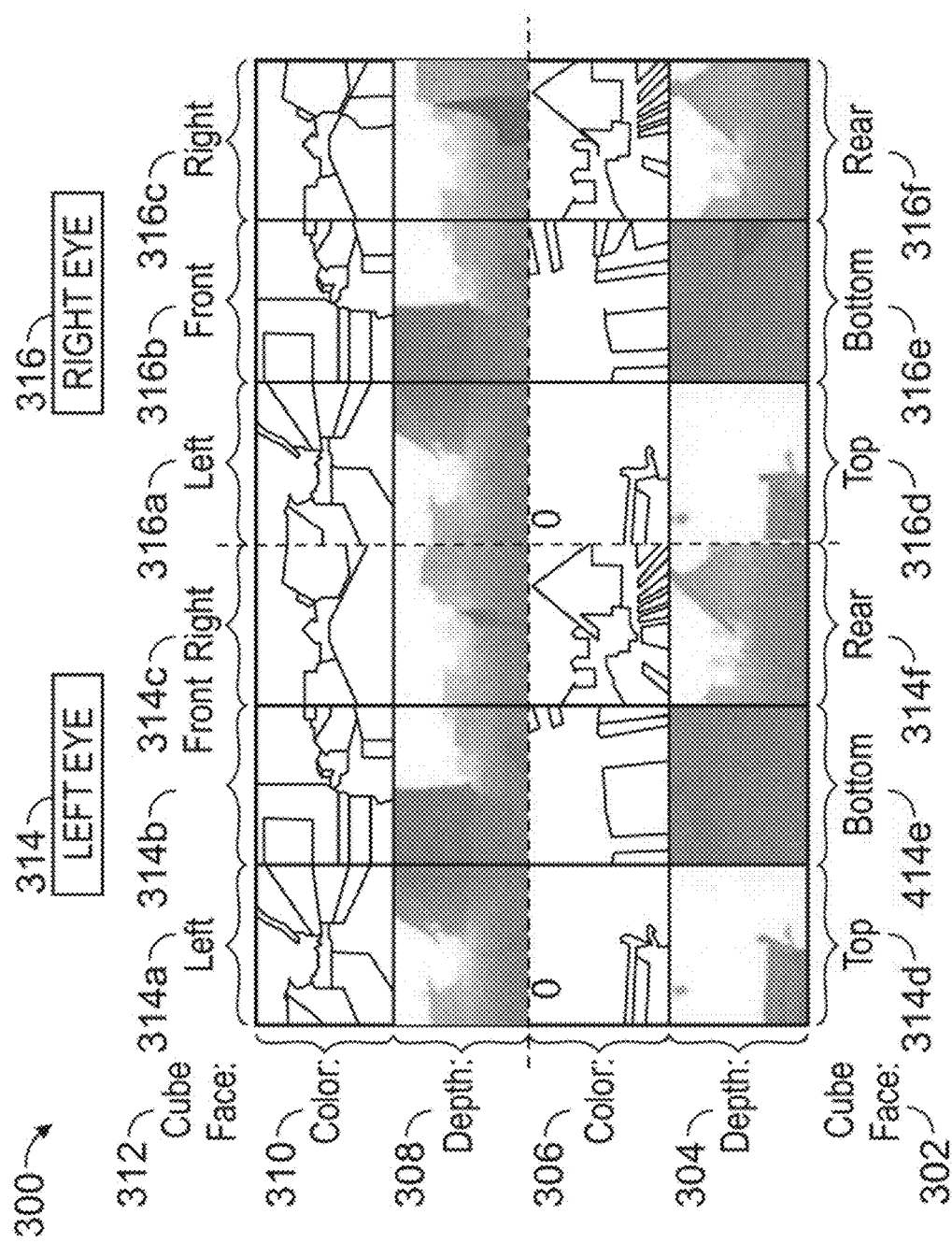
FIG. 3B is a diagram illustrating an example image frame.

FIG. 3B is a diagram illustrating an example image frame that may be used in an implementation of FIG. 2. Each frame may consist of a high resolution frame as shown in FIG. 3B. This type of frame may be utilized by cube map renderer 120. Each frame may be defined with respect to a pose, $p=((x, y, z), (\theta, \varphi, \psi))$. For example, the parameters $(x, y, z)$ may represent the position of mobile device 102 in 3D world coordinates, while, the parameters $(\theta, \varphi, \psi)$ may represent the view orientation (sometimes referred to as rotation) as an Euler angle comprising yaw, pitch, and roll, respectively, of mobile device 102. With appropriate mesh warping the frame allows reconstruction of nearby views that are translated or rotated with respect to the frame's pose. Internally, a frame is composed of four cube maps each being a 360° representation of an environment. The cube map draws a panoramic image on the six sides of a cube, with the center point of the cube being the current pose. With four cube maps and six faces per cube, the frame consists of 24 faces, as illustrated in the frame layout of FIG. 3B.

The four cube maps in a single frame include left eye color (RGB) cube map, left eye depth cube map, right eye color (RGB) cube map, and right eye depth cube map. For example, in FIG. 3, the left eye color (RGB) cube map comprises the 3 faces in each of the color rows 310 and 306, (6 total faces) that are in the left eye half 314 (left half) of FIG. 3, and the left eye depth cube map comprises the three faces in each of the depth rows 308 and 304 (6 total faces) that are in the left eye half 314 (left half) of FIG. 3. The right eye color (RGB) cube map comprises the 3 faces in each of the color rows 310 and 306 (6 total face) that are in the right eye half 316 (right half) of FIG. 3 and the right eye depth cube map comprises the three faces in each of the depth rows 308 and 304 (6 total faces) that are in the right eye half 316 (right half) of FIG. 3). Each face of the cube represents a view perspective. For example, in FIG. 3B, the 3 faces in the color row 310 of the left eye RGB cube comprise left, front, and right views shown in the left 314a, front 314b, and right 314c, columns, respectively. The 3 faces in the color row 306 of the left eye RGB cube comprise top, bottom, and rear views shown in the top 314d, bottom 314d, and rear 314d, columns, respectively. The 3 faces in the color row 310 of the right eye RGB cube comprise left, front, and right views shown in the left 316a, front 316b, and right 316c, columns, respectively. The 3 faces in the color row 306 of the right eye RGB cube comprise top, bottom, and rear views shown in the top 316d, bottom 316e, and rear 316f, columns, respectively. The 3 faces in the depth row 308 of the left eye RGB cube comprise left, front, and right views shown in the left 314a, front 314b, and right 314c, columns, respectively. The 3 faces in the depth row 304 of the left eye RGB cube comprise top, bottom, and rear views shown in top 314d, bottom 314e, and rear 314f columns, respectively. The 3 faces in the depth row 308 of the right eye RGB cube comprise left, front, and right views shown in the left 316a, front 316b, and right 316c, columns, respectively. The 3 faces in the depth row 304 of the right eye RGB cube comprise top, bottom, and rear views shown in the top 316d, bottom 316e, and rear 316f, columns, respectively.

The left and right eye cube maps 314 and 316 exist separately in order to generate a proper stereo view. Their positions are each offset from the frame's pose by a parameter defined as half the inter-pupillary distance (IPD), which may be a user-specific or averaged anatomical property that represents the distance between human eyes. The depth cube maps are not necessary for representing the RGB pixel content of the scene, but are useful during the mesh warping step. All four cube maps in every frame are stored consistently at a fixed canonical orientation looking straight ahead, i.e., $(\theta, \varphi, \psi)=(0, 0, 0)$.

In other implementations, the cube map or view mapping may be configured in any other appropriate way. For example, the cube map may be laid out for only one eye (left or right) and the other eye may be represented by using image based rendering (IBR). The cube map may also be laid out for one eye (left or right) with an additional view of the cube map from another perspective to prevent disocclusions. Other combinations of views are also possible. For example, the cub map maybe laid out with left and right eye views used in combination with an additional view. In further implementations, any type of projection that may be used in mesh warping may be used in place of the cube map. For example, non-linear representation may be used to better distribute resolution. In another alternative implementation a spherical layout mapping may be used.

Also, the depth information may be encoded in a separate frame from the color information frame. For example, the depth may be encoded using a different compression scheme (better suited to encode depth) in a separate frame and two cube maps may be used in parallel Additionally, in other implementations, the color space of the cube map may be encoded in any other appropriate color space, for example, YUV. Also, high dynamic range (HDR) images may be encoded in a scRGB color space (described in International Electrotechnical Commission (IEC) standard 61966-2-2), or in an xvYCC color space (described in IEC standard 61966-2-4).

In the example implementation of FIGS. 1 and 2, server 103 can alter the quality of the video stream at the foveation scene rendering stage and at the foveation scene encoding stage. Both of the two stages allow a lossy compression of the input stream to be performed. The two stages differ in the hardware unit performing the operation, execution cost, the granularity of control, and the type compression artifacts introduced in the display. The foveation scene rendering stage offers finer-grained control, but is more costly to execute. A rendering that is less lossy than its corresponding foveation scene encoding suffers from wasted rendering. Conversely, a foveation scene rendering that is more lossy than its corresponding foveation scene encoding suffers from underutilization of the allocated encoded bits. The foveation rendering stage may be implemented using operations of an existing method. The encoding foveation stage may use encoding foveation according to the embodiments.

In example implementations, the foveation rendering and foveation encoding settings may be aligned/coordinated in view of the differences between them. By using foveation encoding, the amount of bandwidth that is used in the different foveation regions may be influenced. For example, when video is encoded in formats like H.264 and HEVC, it goes through a lossy compression step after the image has been transformed through a DCT. In this lossy step, the transformed image values are quantized by a quantization factor or quantization parameter (QP). This quantization factor determines how many of the low-order bits of the transformed image are discarded. A higher QP results in higher information loss and lower image quality but better compression, while a lower QP results in a better looking image at a higher bitrate.

Figure 4A:
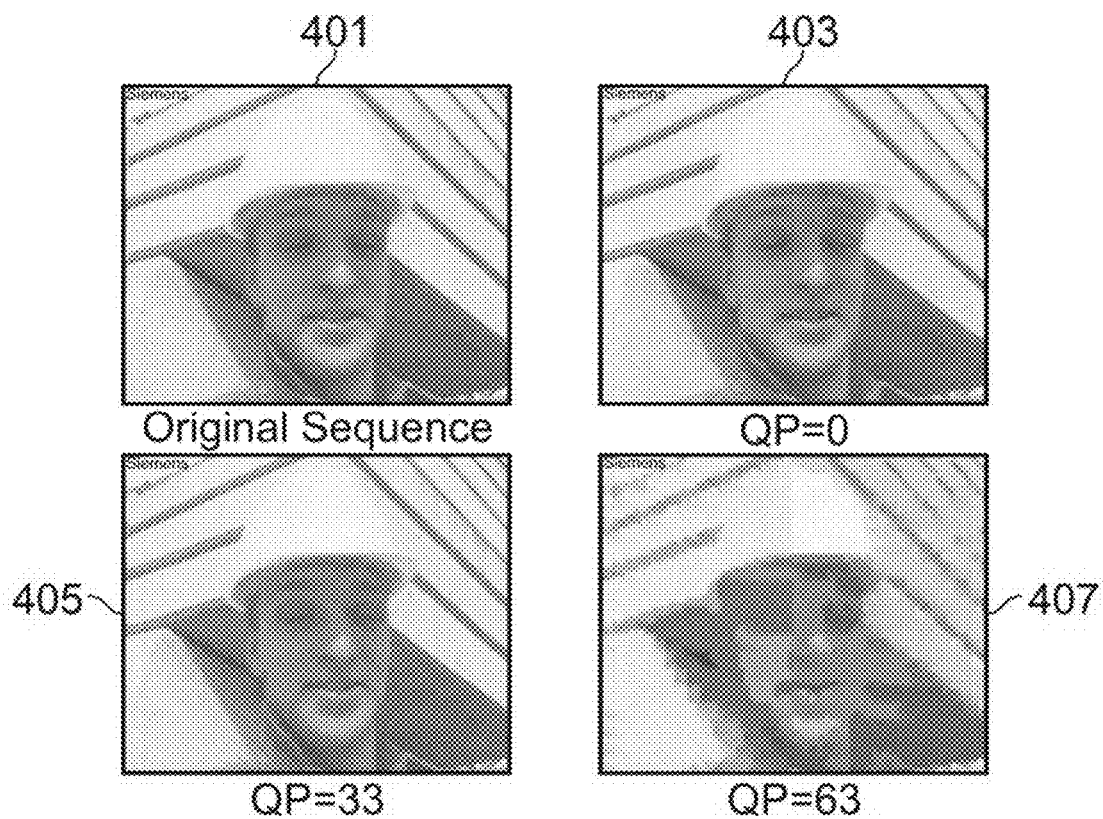
FIG. 4A illustrates examples of encoding foveation.

FIG. 4A shows some examples of foveation encoding applied at varying QP levels. FIG. 4A shows an image of an original sequence 401, an image with a level of QP=0 403, an image with a level of QP=33 405, and an image with level of QP=63 407. The QP is very fine grained, being chosen at the level of a macroblock. A small region of the image typically measures approximately 16×16 pixels but may measure as little as 3×4 pixels. When video image is encoded for a specific bitrate, it is the function of the encoder to choose an adequate QP for each macroblock such that the resulting stream is as close to the target bitrate as possible. The encoder will typically aim for a homogenous level of quality, assigning lower QPs to the areas of high detail of the image, attempting to preserve those details even though those areas of the image are harder to compress. With encoding foveation, region of interest encoding (ROI) (a feature of modern encoders that allows for the QP to be predefined for specific regions of the image regardless of their contents) may be used for advantage. With ROI, foveation regions that are unlikely to be seen can be forced to have high QPs, even if the complexity of the region is high. Also, foveation regions that are highly likely to be seen can be forced to have low QPs, even if the complexity of the region is low. In implementations in which ROI is implemented in hardware, the size of the regions may be switched very quickly, from one frame to the next. Additionally, the overhead of encoding foveation may be low since it is performed inline as part of the hardware encoder's regular stream encoding operations. In order to handle network changes, the example implementations may be configured to respond to reallocate bits in proportion to their contribution to the final image that the client is expected to see.

Figure 4B:
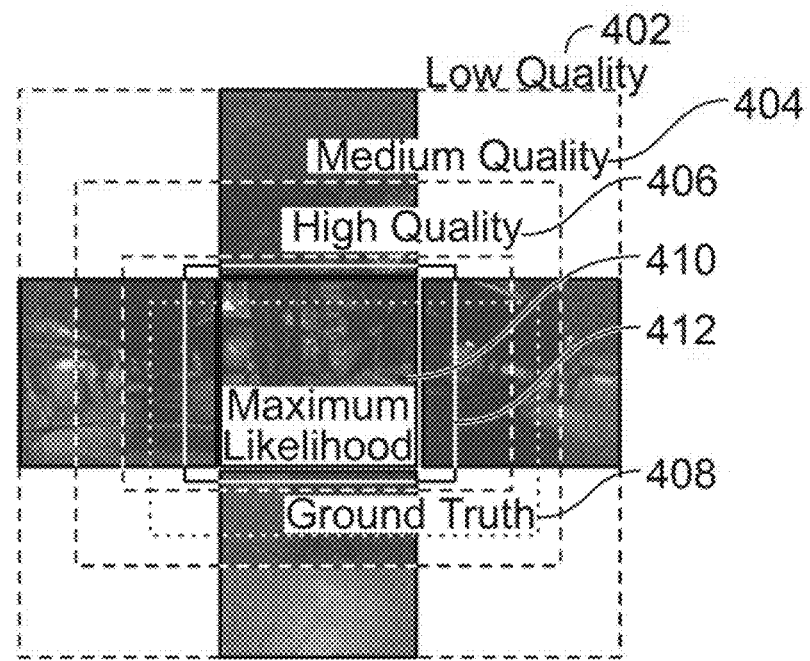
FIG. 4B illustrates examples of encoding foveation applied at varying quantization parameter (QP) levels.
Figure 6:
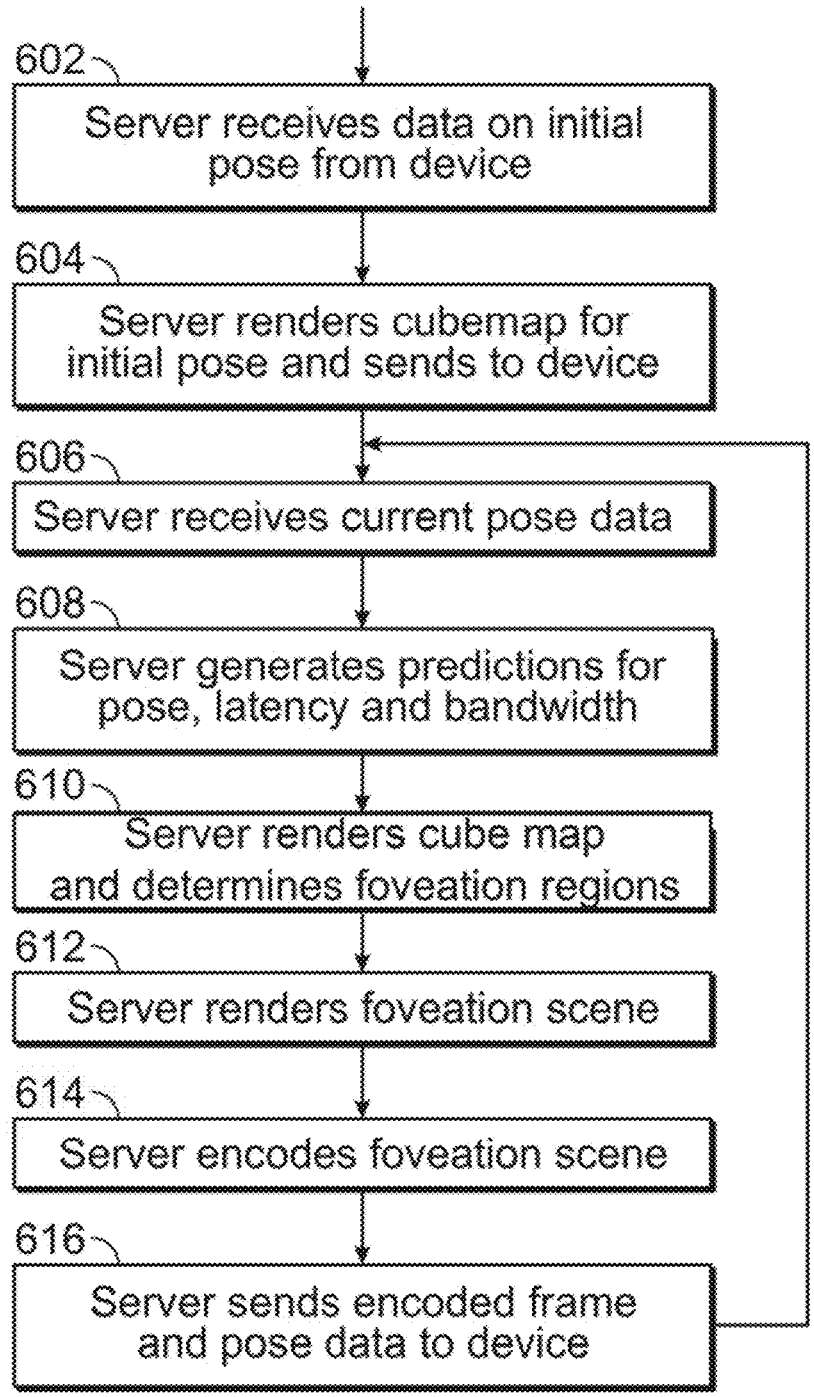
FIG. 6 is a flow diagram showing example operations performed by a server.

FIG. 4B illustrates examples of encoding foveation applied at varying QP levels. For example, FIG. 4B shows a 360° panoramic representation of a cube amp in both horizontal and vertical directions. FIG. 4B shows three quality regions of $r_{\theta, LQ}=1$, $r_{\theta, MQ}=0.7$ and $r_{\theta, HQ}=0$. The representation is centered at p*, the maximum likelihood pose (MLP) and is the pose anticipated to most likely match p^, the client's ground truth pose (GTP). The MLP determines the Maximum Likelihood View (MLV) 412, which is the subset of the entire panorama needed to render a view centered at the MLP. Similarly, GTP determines the ground truth view (GTV) 408. The difference between MLP and GTP can be ascribed to the subject's head displacement over the end-to-end latency interval. The more volatile the head displacement and the longer the latency, the more uncertain we are about the MLP. Regions of the cube map that are more likely to be viewed may be allocated higher pixel density, and those that are less likely to be viewed may be allocated lower pixel density. This may be accomplished by insetting higher resolution regions inside lower resolution regions. Consider the case of three fixed quality levels of decreasing resolution as shown in FIG. 6, high quality (HQ) 406, medium quality (MQ) 404 and low quality (LQ) 402. HQ 406 represents the maximum desired angular resolution. Angular resolution may be defined as pixels per degree of field of view. For example, for a 720 p (1280×720 pixels) target resolution at 100 degree field of view (fov), the desired horizontal angular resolution is 7.2 pixels per degree (ppd). LQ 402 represents the minimum tolerable resolution.

A 3.6 ppd at 100 degree fov is equivalent to 360 p (640×360 pixels) resolution. The remaining intermediate quality levels (in this case, just MQ 404, although more or less levels may be used) are intermediate resolutions between HQ 406 and LQ 402. FIG. 4B shows one example arrangement of quality levels. In an implementation, the lowest quality level (LQ) region 402 may be always clamped to the full panorama ensuring that the user does not see visual discontinuities (i.e., partial or full black screens) regardless of head movement speed. Also, the area of the highest quality level (HQ) 406 may not always be greater than the area of the MLV. The area of the highest quality level (HQ) 406 area may at times be less than the area of the MLV. This implies that the MLV has a greater resolution toward its center than at its periphery. This naturally mimics human ocular physiology where foveation tends toward the center of the field of view.

Figure 5:
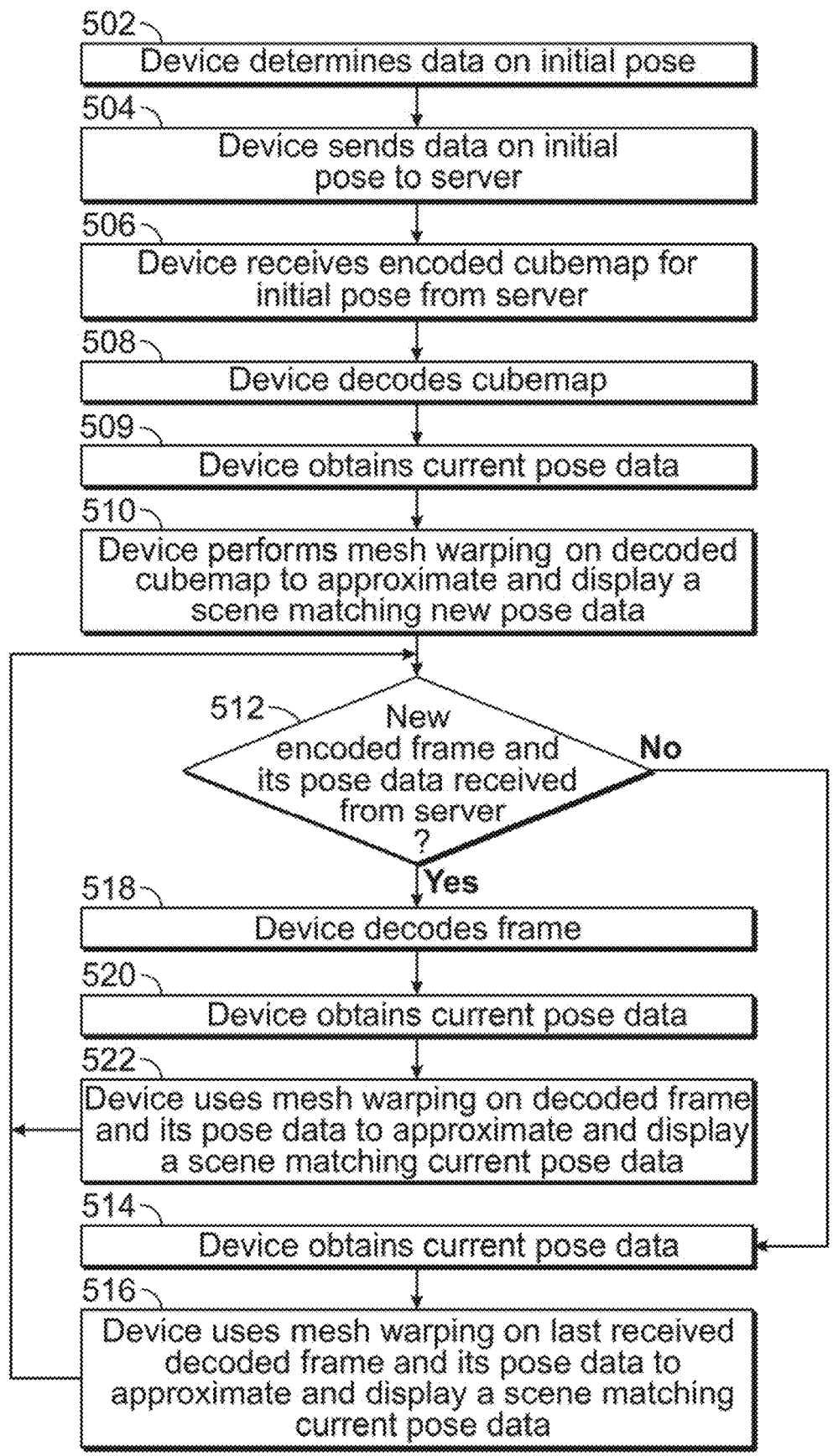
FIG. 5 is a flow diagram showing example operations performed by an example head mounted display.

FIG. 5 is a flow diagram showing example operations performed by an example device, such as HMD 102 of FIG. 1. FIG. 5 illustrates the operations performed in FIG. 2 from the device perspective as the device interacts with a server.

The process begins at 502 where the device determines an initial pose. At 504 the device sends the initial pose to the server and, at 506, the device receives an encoded cube map for the initial pose back from the server. The cube map is then decoded at 508.

At 509, the device obtains the current pose of the device. Then, at 510, the device performs mesh warping on the decoded cube map using the current pose and the initial pose (used by the server to render the cube map) to approximate and display the virtual reality scene to the device user.

At 512, the device determines if a new encoded frame and its associated pose data have been received from the server and is available for processing. If new encoded frame and its associated pose data are available for processing, the process moves to 518 where the device decodes the frame and to 520, where the device obtains the current pose of the device. The device then performs mesh warping on the decoded frame using the associated pose data of the decoded frame and the current pose, to approximate and display the virtual reality scene to the device user. The process returns to 512 where the device again determines if a new encoded frame and its associated pose data have been received from the server and is available for processing.

If it is determined at 512 that a newly received encoded frame and its associated pose data are not available for processing, the process moves to 514 where the device obtains the current pose of the device. At 516, the device then performs mesh warping on the last received decoded frame using the associated pose data of the last received decoded frame and the current pose, to approximate and display the virtual reality scene to the device user. The process then returns to 512 where the device determines if a new encoded frame and its associated pose data have been received from the server and are available for processing.

The process will continue repeating operations 512, 518, 520, and 522, or operations 512, 514, and 516 to display the virtual reality scene to the device user. Whenever a newly received frame is determined to be available at 512, the device will mesh warp the newly received frame. When a newly received frame is not available, the device will mesh warp the last received decoded frame using the current pose. In this manner, the device may display frames at a rate faster than the rate at which the sever sends new frames.

FIG. 6 is a flow diagram showing example operations performed by an example server, such as server 103 of FIG. 1. FIG. 6 illustrates the operations performed in FIG. 2 from the server perspective as the server interacts with a device.

At 602 the server receives an initial pose from the device and, at 604, the server renders the cube map for the initial pose and encodes and sends the cube map to the device. Next, at 606, the server receives the current pose from the device. At 608, the server generates predictions for pose, latency, bandwidth and/or jitter, and, at 610, the server uses predictions for pose, latency, bandwidth and/or jitter to render the cube map and determine the optimal foveation regions. At 612, the server performs foveation rendering to render the foveation scene and, at 614 performs foveation encoding to encode the foveation scene. Next, at 616, the server sends the encoded frame and its associated pose data to the device.

Figure 7:
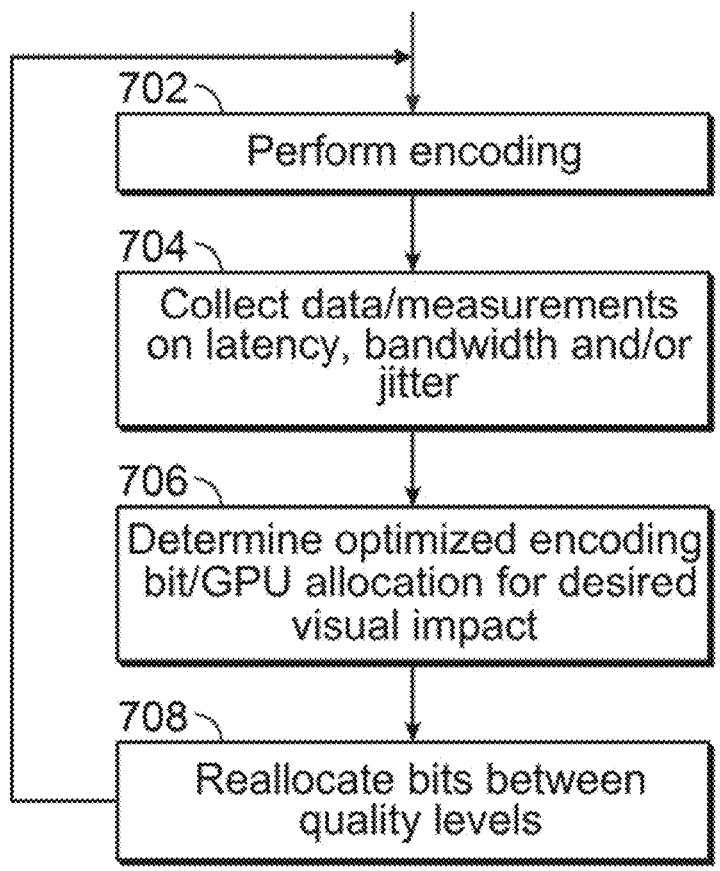
FIG. 7 is a flow diagram showing example operations performed when responding to latency, bandwidth and/or jitter changes.

FIG. 7 is a flow diagram showing example operations performed in a server when responding to latency, bandwidth and/or jitter changes. The process begins at 702 where the server is performing encoding of a frame to be sent to a device. At 704, as the server performs encoding, the server collects data and measurements on network latency, bandwidth and/or jitter. At 706 the server determines optimized encoding bit/GPU allocation for a desired visual impact/effect. Then, at 708, the server reallocates bits between the different equality levels of the foveation scene to realize the optimized encoding.

In an implementation of FIG. 7, the goal of bit reallocation may be to respond to changes in latency, bandwidth and jitter in a predefined manner. For example, when latency gets high, the future maximum likelihood pose (MLP) is less certain. In one example implementation, it may be determined to spread out bits across a wider area rather than concentrate bits at a single location. For example, more bits may be allocated to medium quality (MQ) and less to high quality (HQ). Conversely, when latency is low, the MLP is more certain. In this case more bits may be distributed to HQ instead of to MQ. In another example, when bandwidth gets worse, fewer bits are available and a question is whether to take bits from MQ or HQ. In one example implementation, it may be determined that bits should be deallocated from both MQ and HQ in equal proportion. The reason for a proportional decrease is that a bandwidth change alone does not signal any change in the distribution of the pose. Therefore, there is no reason to deallocate proportionally more bits from MQ vs. HQ (or vice versa). Similarly, in this implementation, when bandwidth improves, MQ and HQ should receive bit allocations in equal proportion.

Responding to jitter changes is more nuanced. Jitter may indicate that both periods of low and high latency are likely. Therefore, an increase in jitter simultaneously decreases uncertainty of the future pose when latency is low, and increases uncertainty of future pose when latency is high. In one example implementation, it may be determined to move bits away from MQ and toward HQ and low quality (LQ) when jitter increases. In all cases, LQ always remains clamped to the extents of the panorama. In various implementations, the allocation of bits to account for changes in latency, bandwidth and jitter in a virtual reality system may be performed based on other predefined allocation methods. For example, the allocation method used may be based on analysis of the system or experimental data derived from the system. The method of bit allocation may be based on combined changes of the latency, bandwidth and jitter and their interactions with one another.

An example implementation may be based on maximizing the quality experience by a user. Let $P=\{P_T, P_R\}$ be the vector of random variable representing the pose. The vector consists of a translation component $P_T=\{P_x, P_y, P_z\}$ and rotation component $PR=\{P_\theta, P\varphi\}$. The rotation components $P_\theta$ and $P\varphi$ represent yaw and pitch, respectively. Let p(L) be the distribution of future network latency. Specifically, we let p(L) be shorthand for $P(L_{t+1}|L_t=l)$ where $L_t$ is the current latency, l is the latest empirical latency observation and $L_{t+1}$ is the latency at the time of the next transmission. Let p(P|L) be the conditional distribution of pose P dependent upon the future latency L. In general, the larger the latency, the more uncertain the pose is. It follows that p(P)=p(L)p(P|L) is the distribution of future pose over all latencies. For convenience, we also define $P_R^0$ to be the pose rotation re-centered at the maximum likelihood pose rotation:

$$P_R^0 = P_R - E(P_R)$$

The objective is to maximize expected quality E(Q) in both yaw and pitch directions by choosing threshold set $r=\{r_i|i=0\ldots n\}$ where $r_i=\{r_{\theta,i}, r_{\varphi,i}\}$.

$$\underset{r}{\text{Max}}\ E(Q)$$

The set r defines the bounding boxes for all the various quality levels. Each variable $r_{\theta,i}$ (or $r_{\varphi,i}$) takes on a value [0 . . . 1] whose interpretation is as follows: a fraction $r_i$ of the panorama along the θ dimension (or φ dimension) should be at most quality level i. This fraction is centered symmetrically about the MLP and emanates outward until reaching its quota $r_i$. For example, in FIG. 4B $r_{\theta,\ MQ}$=0.7. Model may be done symmetrically about the MLP because subjects turn their heads to the left and right (and up and down) with roughly equally probability. Since a rotation has a range of 0° to 180° when only considering symmetric rotations, we also define $p_i=180r_i$ which we will use for convenience We found changes in the third rotation dimension, roll which corresponds to a sideways tilting of the head and chin, to be extremely rare in practice so we do not consider it further here. However, the techniques may be extended to roll in a straightforward way.

The expected quality is defined as follows:

$$E(Q) = \sum_{i=1..n} q_i \int_{\rho_{i-1}}^{\rho_i} p(P_R^0) dP_R$$

where $q_i$ is the marginal quality contributed by quality level i. Marginal quality can be thought of as the quality (in terms of Structural Similarity (SSIM) or PSNR units) apportioned to one degree of angular resolution. SSIM score is a standard criteria of the video compression community used to quantify the perceived loss in video quality between a pristine image f* and a distorted version of the image, f. Pristine video for an HMD is defined as the video generated by a high-end GPU tethered to the HMD.

Rewriting the equation for expected quality yields:

$$= \sum_{i=1..n} (q_i - q_{i+1}) \int_0^{\rho_i} p(P_R^0) dP_R$$

$$= \sum_{i=1..n} (q_i - q_{i+1}) \int_0^{\rho_{\varphi,i}} \int_0^{\rho_{\varphi,i}} p(P_\theta^0|P_\varphi^0) P_\varphi^0 dP_\theta dP_\varphi$$

$$= \sum_{i=1..n} (q_i - q_{i+1}) \int_0^{\infty} \int_0^{\rho_{\varphi,i}} \int_0^{\rho_{\varphi,i}} p(P_\theta^0|P_\varphi^0, L) p(P_\varphi^0|L) p(L) P_\theta dP_\varphi dL$$

The definite integral in the equation above represents a Cumulative Distribution Function (CDF). For example, the term $\int_0^{p_\theta} p(P_\theta^0|P_\varphi^0, L)$ is equivalent to the CDF of the variable $P_\theta^0$ conditioned upon the variables $P_\varphi^0$ and L evaluated at $p_{\theta,i}$. In other words, we can evaluate the expected quality if we have estimates of the (conditional) CDFs for $P_\theta^0$, $P_\varphi^0$ and L.

The assignment of the threshold set r must be made such that the bandwidth budget is not exceeded. This constraint is expressed as:

$$b \geq \sum_{i=1..n} bi(r_{\theta,i}r_{\varphi,i} - r_{\theta,i-1}r_{\varphi,i-1}) = \sum_{i=1..n} (b_i - b_{i+1}) r_{\theta,i} r_{\varphi,i}$$

where b is the total budget of bits available for a frame. Hence, b is proportional to the bandwidth. For example, if the network bandwidth is 30 Mbps and the frame rate is 60 fps, then b is 0.5 Mbits per frame (Mbpf). Also, bi is the marginal cost of quality level i. Its units are Mbits per degree of angular resolution. Finally, we constrain $r_i$ as follows $$0 = r_{\theta,0} \leq r_{\theta,1} \leq r_{\theta,2} \leq \ldots \leq r_{\theta,n} = 1$$

$$0 = r_{\varphi,0} \leq r_{\varphi,1} \leq r_{\varphi,2} \leq \ldots \leq r_{\varphi,n} = 1$$

This last set of constraints ensures that higher quality regions are always inset within lower quality regions, as shown in FIG. 4B.

This example implementation adjusts to changes in network latency. For example, when observed latency l increases, expected latency E(L) is likely to increase, which in turn means $E(P_R^0)$ is also likely to increase, which will tend to penalize high quality regions in favor of low quality regions since low quality regions will more likely be part of the ground truth view (GTV) when $E(P_R^0)$ is greater.

This example implementation also handles bandwidth changes in a straightforward way. Increases in bandwidth simply relax the constraint on b providing more bits to improve quality. Conversely, decreases in bandwidth tighten available bits.

This example implementation also accounts for network jitter. Jitter is embodied as variance in latency. Therefore, high jitter will manifest as greater spread in the p(L) distribution. This matches the notion that greater jitter corresponds to less certainty about future head poses and hence favors MQ over HQ. Accounting for network jitter is very important because jitter can be up to 20 ms which is not tolerable for a good HMD experience Finally the pose distribution p(P) of the example implementation captures user and content variability, which can both be large. First, two users can exhibit very different head and neck movements. Influencing factors such as age of the user, neck injury history and familiarity with head-mounted displays, can cause differences. Second, different content can illicit highly different pose responses. For example, the motion of the head and neck when viewing landscape scenery differ greatly from that when viewing task completion missions. Personalized pose behavior may be encoded in p(P).

The above formulation relies on several inputs. Latency l and bandwidth b measurements may be provided by a rate controller component. Marginal quality $q_i$ and costs $b_i$ may be calculated during an offline profiling phase, which may be implemented by performing a frame dump to capture a user trace at the highest-possible quality (level 0, without any foveation). Then the frames are forked i times, once for each quality level. Each fork is render-down sampled and encoded uniformly at quality level i. The marginal costs are computed as $b_i=|v_i|-|v_{i-1}|$ where $|v_i|$ is the size of the video foveated at setting i. The marginal qualities are computed as $q_i=SSIM_{v0}(vi)-SSIM_{v0}(vi-1)$ which uses the highest quality video $v_0$ as the reference video when computing SSIM scores. This process is repeated for multiple user traces to arrive at averaged values for marginal costs and qualities. Further refinement of marginal cost and quality can be made based on anticipated scene types (e.g., outdoor, indoor, photo-realistic, animated, dimly lit, etc.) if desired.

Since $P_\theta^0$, $P_\emptyset^0$ and L are directly observable variables, we can either use their empirical CDFs, or fit a parameterized model to the data. Each method has its advantages. The parameter-less empirical CDF (ECDF) method makes no modeling assumptions and therefore is robust to unanticipated data distributions. However, optimization techniques for an ECDF have execution times that can be proportional to the discretization of the ECDF, and optimality is not assured (e.g., a local maximum may be encountered). A parameterized model may avoid these pitfalls. Specifically, if the parameterized PDF model is constrained to be monotonic, then the tools of positive semi-definite optimization (which is closely related to convex optimizations) can be applied.

Figure 8:
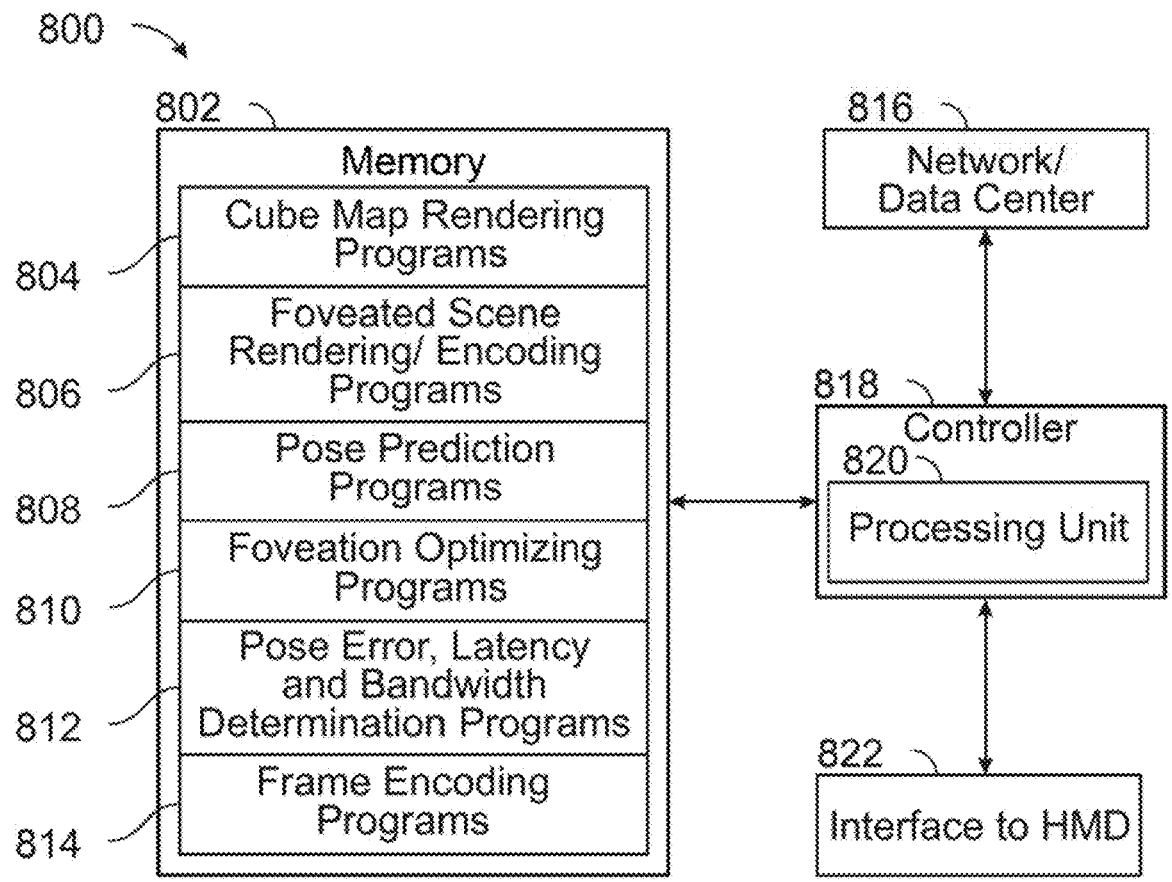
FIG. 8 shows an example server device.

Referring now to FIG. 8, therein is a simplified block diagram of an example server 800 which may be implemented to perform operations according to FIGS. 2 and 6. For example, server 103 of FIG. 1 may be implemented according to server 800 of FIG. 8. Server 800 may include a controller 818 having processing unit 820, a memory 902, interfaces to HMDS 822, and Network/data center interfaces 816. Memory 802 may be implemented as any type of computer readable storage media, including non-volatile and volatile memory. Memory 802 is shown as including cube map rendering programs 804, foveated scene rendering/encoding programs 806, pose prediction programs 808, foveation optimizing programs 810, pose error, latency, and bandwidth determination programs 812, and frame encoding programs 814.

Controller 818 and processing unit 820 may comprise one or more processors, or other control circuitry, or any combination of processors and control circuitry that provide overall control of server 800 according to the disclosed embodiments.

Cube map rendering programs 804, foveated scene rendering/encoding programs 806, pose prediction programs 808, foveation optimizing programs 810, pose error, latency, and bandwidth determination programs 812, and frame encoding programs 814, when executed, cause processing unit 806 to control controller 800 to perform operations as shown in FIGS. 2 and 6. Server 800 may communicate with HMDs, such as HMD 102 of FIG. 2, through interface to HMDS 822. The interface to HMDS 822 may be implemented through a wireless network.

Server 800 is shown as a single server. However, server 800 may be representative of server functions or server systems provided by one or more servers or computing devices that may be co-located or geographically dispersed to implement server 800. The term server as used in this disclosure is used generally to include any apparatus, device, computer, computing devices or communications equipment that may be implemented to perform functions and processes of the embodiments.

Figure 9:
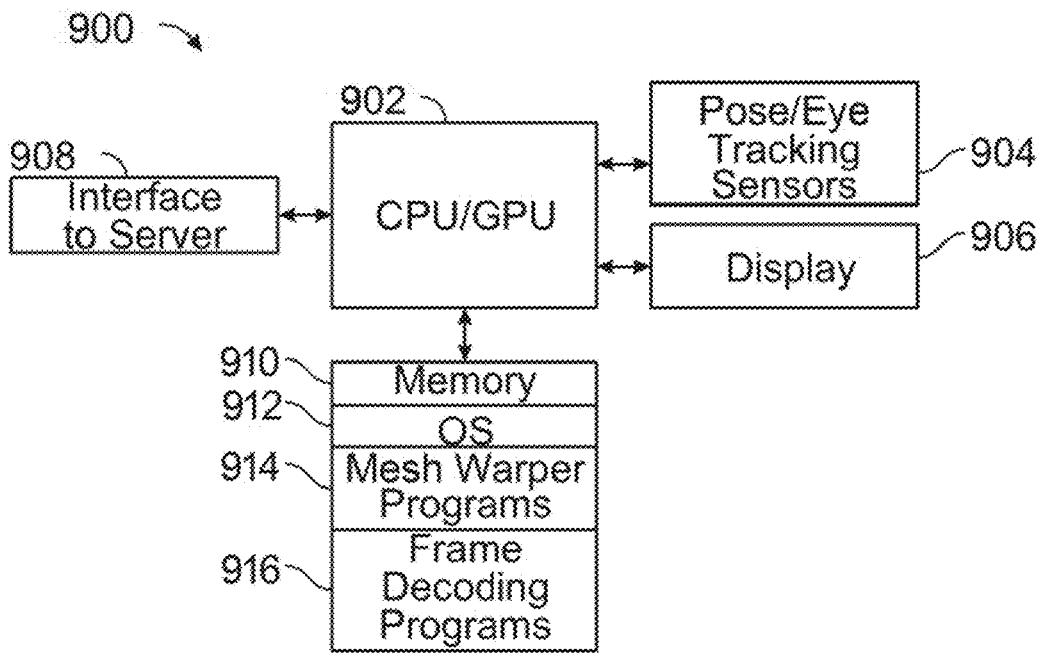
FIG. 9 shows an example head mounted display device.

FIG. 9 is a simplified block diagram of an example device 900. The functions of device 102 of FIGS. 1 and 2 may be implemented on a device such as device 900. In an example implementation, device 900 may be a mobile head mounted display (HMD). In other example implementations, device 900 may be implemented as any type of device that may be configured to allow a user to interact with a virtual environment.

Device 900 may include a central processing unit/graphics processing unit (CPU/GPU) 902, memory 910, pose/eye tracking sensors 904, display 906, and wireless interface 908. Memory 910 may be implemented as any type of computer readable storage media, including non-volatile and volatile memory. Memory 910 is shown as including code comprising device operating system (OS) 912, mesh warping programs 914, and frame decoding programs 816. Pose/eye tracking sensors may comprise one or more sensors on device 900 that provide device position, device orientation and eye orientation information to CPU/GPU 902. Display 906 may comprise a display mounted to show VR scenes in view of a user's eyes when device 900 is worn as a HMD. Wireless interface 908 may allow communication with a server, for example, to perform the operations described in relation to FIGS. 2 and 5.

CPU/GPU 902 may comprise one or more processors, or other control circuitry, or any combination of processors and control circuitry. Mesh warping programs 914 and frame decoding programs 916 provide the functions shown in device 201 of FIG. 1. When executed, mesh warping programs 914 and frame decoding programs 916 may cause processor CPU/GPU 902 to control device 900 to perform processes described in relation to FIGS. 2 and 5.

The example embodiments disclosed herein may be described in the general context of processor-executable code or instructions stored on memory that may comprise one or more computer readable storage media (e.g., tangible non-transitory computer-readable storage media such as memory 802 and cache memory 910. As should be readily understood, the terms "computer-readable storage media" or "non-transitory computer-readable media" include the media for storing of data, code and program instructions, such as memory 802 and memory 910, and do not include portions of the media for storing transitory propagated or modulated data communication signals.

While implementations have been disclosed and described as having functions implemented on particular wireless devices operating in a network, one or more of the described functions for the devices may be implemented on a different one of the devices than shown in the figures, or on different types of equipment operating in different systems.

The disclosed embodiments include a server comprising one or more processors, and memory in communication with the one or more processors, the memory comprising code that, when executed, causes the one or more processors to receive first pose data from a device, generate second pose data, including a pose prediction, based at least on the first pose data, render a map representation based at least on the pose prediction, determine a plurality of regions of the map representation based on a likelihood of view of each of the plurality of regions, perform foveation in each of the plurality of regions of the map representation and generate an encoded frame based on each of the plurality of regions and at least one network parameter, and send the encoded frame and second pose data to the device. Each of the plurality of regions of the map representation may be associated with a quality level and the code may be further executable to cause the one or more processors to perform the foveation for each of the plurality of regions based on each region's associated quality level. The foveation may include performing encoding foveation using a different quantization parameter for each of the plurality of regions of the map representation. The foveation may include performing rendering foveation for each of the plurality of regions of the map representation. The at least one network parameter may include latency. The at least one network parameter may include bandwidth. The at least one network parameter may include jitter. The code, when executed, may further cause the one or more processors to perform foveation in each of the plurality of regions of the map representation and generate an encoded frame based on the likelihood of view of each of the plurality of regions and at least one network parameter. The code may cause the one or more processors to perform foveation by causing the processor to determine that the at least one network parameter has change and modify an allocation of bits between at least two of the plurality of regions based on the change in the at least one network parameter. The map representation may comprise a cube map representation.

The disclosed embodiments further include a device comprising one or more processors, and memory in communication with the one or more processors, the memory comprising code that, when executed, causes the one or more processors to control the device to receive a first frame and first pose data from a server, determine second pose data, mesh warp the first frame using the first and second pose data to generate a first mesh warped frame, display the first mesh warped frame, determine third pose data, determine if a second frame and fourth pose data have been received from the server, and, if it is determined that a second frame has not been received, mesh warp the first frame using the first and third pose data to generate a second mesh warped frame, and display the second mesh warped frame. If it is determined that a second frame has been received the code may cause the one or more processors to control the device to mesh warp the second frame using the third and fourth pose data to generate a third mesh warped frame, and display the third mesh warped frame. The code, when executed, may further cause the one or more processors to control the device to send the third pose data to the server. The frame may comprise an image derived from a stereo cube map. The device may comprise a head mounted display and the pose data may comprise a position of the device and a view orientation of a user of the device.

The disclosed embodiments further include a method in a virtual reality system comprising receiving first pose data sent from a device at a server, generating second pose data, including a pose prediction, based at least on the first pose data, rendering a map representation based at least on the pose prediction, determining a plurality of regions of the map representation based on a likelihood of view of each of the plurality of regions, performing foveation in each of the plurality of regions of the map representation and generating an encoded frame based on each of the plurality of regions and at least one network parameter, and sending the encoded frame and second pose data from the server to the device. Each of the plurality of regions of the map representation may be associated with a quality level and the performing the foveation for each of the plurality of regions may comprise performing the foveation for each region based on its associated quality level and at least one network parameter. The performing foveation may comprise performing encoding foveation using a different quantization parameter for each of the plurality of regions of the map representation. The method may further comprise receiving, at a device, the encoded frame and second pose data from the server, determining third pose data, decoding the encoded frame, mesh warping the decoded frame using the second and third pose data to generate a mesh warped frame, and displaying the mesh warped frame at the device. The performing foveation may comprise performing encoding foveation using a different quantization parameter for each of the plurality of regions of the map representation. The performing foveation may comprise performing rendering foveation for each of the plurality of regions of the map representation.

while the functionality disclosed herein has been described by illustrative example using descriptions of the various components and devices of embodiments by referring to functional blocks and processors or processing units, controllers, and memory including instructions and code, the functions and processes of the embodiments may be implemented and performed using any appropriate functional blocks, type of processor, circuitry or combinations of processors and/or circuitry and code. This may include, at least in part, one or more hardware logic components. For example, and without limitation, illustrative types of hardware logic components that can be used include field programmable gate arrays (FPGAs), application specific integrated circuits (ASICs), application specific standard products (ASSPs), system-on-a-chip systems (SOCs), complex programmable logic devices (CPLDs), etc. Use of the term processor or processing unit in this disclosure is mean to include all such implementations.

Although the subject matter has been described in language specific to structural features and/or methodological operations or acts, it is to be understood that the subject matter defined in the appended claims is not necessarily limited to the specific features, operations, or acts described above. Rather, the specific features, operations, and acts described above are disclosed as example embodiments, implementations, and forms of implementing the claims and these example configurations and arrangements may be changed significantly without departing from the scope of the present disclosure. Moreover, although the example embodiments have been illustrated with reference to particular elements and operations that facilitate the processes, these elements, and operations may or combined with or, be replaced by, any suitable devices, components, architecture or process that achieves the intended functionality of the embodiment. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A server comprising:
   one or more processors; and
   a memory in communication with the one or more processors, the memory comprising code that, when executed, causes the one or more processors to:
   generate a map representation of image data;
   identify a plurality of foveation regions in the map representation; and
   encode each foveation region in the map representation to generate an encoded frame, wherein a resolution used to encode each foveation region, only, is determined based on at least one network parameter of a data network.

2. The server of claim 1, wherein the at least one network parameter includes latency, bandwidth, and jitter.

3. The server of claim 1, wherein the code, when executed, further causes the one or more processors to send the encoded frame to a head mounted device.

4. The server of claim 1, wherein for each foveation region in the map representation, the one or more processors:
  collect data and measurements on the at least one network parameter; and
  determines the resolution used to encode said each foveation region.

5. The server of claim 1, wherein the plurality of foveation regions in the map representation includes a high quality (HQ) region and a medium quality (MQ) region, wherein the code, when executed, causes the one or more processors to allocate the resolution used to encode each foveation region between the HQ region and the MQ region based on the at least one network parameter.

6. The server of claim 5, wherein the at least one network parameter is network latency, wherein when the network latency increases then the resolution used to encode the HQ region is decreased and the resolution used to encode the MQ region is increased and when the network latency decreases then the resolution used to encode the HQ region is increased and the resolution used to encode the MQ region is decreased.

7. The server of claim 5, wherein the at least one network parameter is network bandwidth, wherein when the network bandwidth decreases then the resolution used to encode the HQ region and the MQ are both decreased, wherein when the network bandwidth increases then the resolution used to encode the HQ region and the MQ are both increased.

8. The server of claim 5, wherein the at least one network parameter is network jitter, wherein when the network jitter increases then the resolution used to encode the MQ region is decreased and the resolution used to encode the HQ region is increased and the resolution used to encode a low quality (LQ) region of the map representation is increased.

9. A device comprising:
  one or more processors; and
  a memory in communication with the one or more processors, the memory comprising code that, when executed, causes the one or more processors to:
  receive an encoded frame from a server over a data network;
  generate a mesh warped frame using the encoded frame; and
  display the mesh warped frame,
  wherein the encoded frame comprises a plurality of encoded foveation regions,
  wherein each foveation region, only, is encoded using a resolution that is determined based on at least one network parameter of the data network.

10. The device of claim 9, wherein the at least one network parameter includes latency, bandwidth, and jitter.

11. The device of claim 9, wherein the plurality of foveation regions in the encoded includes a high quality (HQ) region and a medium quality (MQ) region, wherein the resolution used to encode each foveation region between the HQ region and the MQ region is based on the at least one network parameter.

12. The device of claim 11, wherein the at least one network parameter is network latency, wherein when the network latency increases then the resolution used to encode the HQ region is decreased and the resolution used to encode the MQ region is increased and when the network latency decreases then the resolution used to encode the HQ region is increased and the resolution used to encode the MQ region is decreased.

13. The device of claim 11, wherein the at least one network parameter is network bandwidth, wherein when the network bandwidth decreases then the resolution used to encode the HQ region and the MQ are both decreased, wherein when the network bandwidth increases then the resolution used to encode the HQ region and the MQ are both increased.

14. The device of claim 11, wherein the at least one network parameter is network jitter, wherein when the network jitter increases then the resolution used to encode the MQ region is decreased and the resolution used to encode the HQ region is increased and the resolution used to encode a low quality (LQ) region of the map representation is increased.

15. A method in a virtual reality system comprising:
  generating a map representation of image data;
  identifying a plurality of foveation regions in the map representation; and
  encoding each foveation region in the map representation to generate an encoded frame, wherein a resolution used to encode each foveation region, only, is determined based on at least one network parameter of a data network.

16. The server of claim 15, wherein the at least one network parameter includes latency, bandwidth, and jitter.

17. The method of claim 15, wherein the plurality of foveation regions in the map representation includes a high quality (HQ) region and a medium quality (MQ) region, wherein the code, when executed, causes the one or more processors to allocate the resolution used to encode each foveation region between the HQ region and the MQ region based on the at least one network parameter.

18. The method of claim 17, wherein the at least one network parameter is network latency, wherein when the network latency increases then the resolution used to encode the HQ region is decreased and the resolution used to encode the MQ region is increased and when the network latency decreases then the resolution used to encode the HQ region is increased and the resolution used to encode the MQ region is decreased.

19. The method of claim 17, wherein the at least one network parameter is network bandwidth, wherein when the network bandwidth decreases then the resolution used to encode the HQ region and the MQ are both decreased, wherein when the network bandwidth increases then the resolution used to encode the HQ region and the MQ are both increased.

20. The method of claim 17, wherein the at least one network parameter is network jitter, wherein when the network jitter increases then the resolution used to encode the MQ region is decreased and the resolution used to encode the HQ region is increased and the resolution used to encode a low quality (LQ) region of the map representation is increased.

* * * * *